(12) United States Patent
Koteshwar Srinath et al.

(10) Patent No.: US 11,387,870 B2
(45) Date of Patent: Jul. 12, 2022

(54) MIMO DETECTOR SELECTION

(71) Applicant: NOKIA TECHNOLOGIES OY, Espoo (FI)

(72) Inventors: Pavan Koteshwar Srinath, Orsay (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/518,199

(22) Filed: Nov. 3, 2021

(65) Prior Publication Data
US 2022/0182111 A1 Jun. 9, 2022

(30) Foreign Application Priority Data
Dec. 4, 2020 (FI) ..................................... 20206258

(51) Int. Cl.
*H04B 7/0413* (2017.01)
*H04L 25/02* (2006.01)

(52) U.S. Cl.
CPC ....... *H04B 7/0413* (2013.01); *H04L 25/0242* (2013.01)

(58) Field of Classification Search
CPC .. H04B 7/0413; H04B 17/309; H04B 7/0452; H04B 7/0404; H04L 25/0222; H04L 25/0242; H04L 27/20; H03M 13/1108; H03M 13/2933; H04W 74/004
See application file for complete search history.

(56) References Cited

U.S. PATENT DOCUMENTS

| 8,094,744 B1 | 1/2012 | Song et al. |
| 2006/0018410 A1 | 1/2006 | Onggosanusi et al. |
| 2006/0148506 A1 | 7/2006 | Hoo |
| 2010/0027703 A1 | 2/2010 | Yeh et al. |
| 2020/0293896 A1* | 9/2020 | Kwon .................... G06N 3/084 |

(Continued)

OTHER PUBLICATIONS

H. Kwon and K. Song, "MIMO-OFDM Detector Selection using Reinforcement Learning," 2020 International Conference on Computing, Networking and Communications (ICNC), Big Island, HI, USA, 2020, pp. 347-352.

(Continued)

*Primary Examiner* — Rahel Guarino
(74) *Attorney, Agent, or Firm* — Squire Patton Boggs (US) LLP

(57) ABSTRACT

Embodiments can include receiving transmissions over a channel at a receiver of a MIMO communication system; the transmissions are received from a plurality of transmitters in communication with the receiver. Each communication is a separate communication having a modulation and coding scheme. An estimate of the channel is converted into an estimate, for each of a plurality of transmitters, of a bit-metric decoding rate for each of a plurality of MIMO detectors. The estimated bit-metric decoding rate for each of the transmitters for each of the MIMO detectors is converted into an estimated bit error rate for each of the MIMO detectors for each of the transmitters. One of the MIMO detectors is selected for use in generating log-likelihood ratios for bits transmitted from the transmitters to the receiver. The one of the MIMO detectors is selected based on the estimated bit-error rates and a target block error rate.

14 Claims, 14 Drawing Sheets

(56) References Cited

U.S. PATENT DOCUMENTS

2020/0304233 A1 9/2020 Garcia et al.
2020/0343962 A1 10/2020 Kwon et al.

OTHER PUBLICATIONS

Communication of Acceptance dated May 3, 2021 corresponding to Finnish Patent Application No. 20206258.
Finnish Search Report dated May 3, 2021 corresponding to Finnish Patent Application No. 20206258.
S. Chaudhari et al., "Reliable and Low-Complexity MIMO Detector Selection using Neural Network," In: 2020 International Conference on Computing, Networking and Communications (ICNC), Big Island, HI, IEEE, Feb. 17, 2020, pp. 608-613.
G. Bocherer, "Achievable Rates for Probabilistic Shaping," Mathematical and Algorithmic Sciences Lab, Huawei Technologies France S.A.S.U., May 22, 2018, https://arxiv.org/pdf/1707.01134.
Extended European Search Report dated May 17, 2022 corresponding to European Patent Application No. 21212063.8.

* cited by examiner

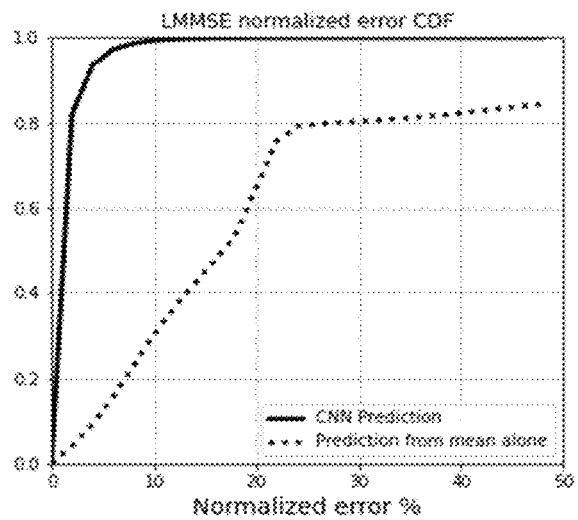
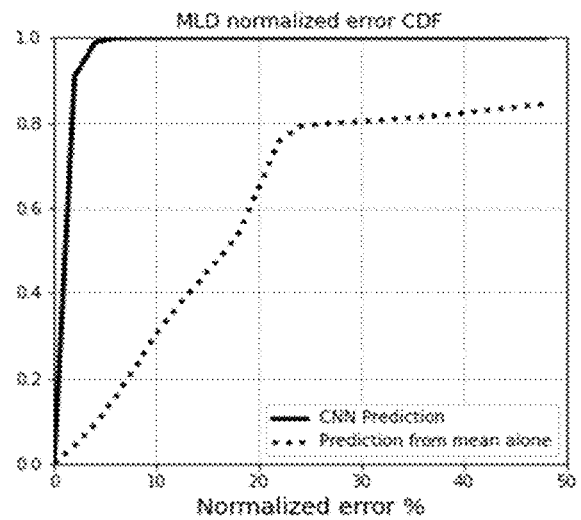
FIG. 9A
FIG. 9B
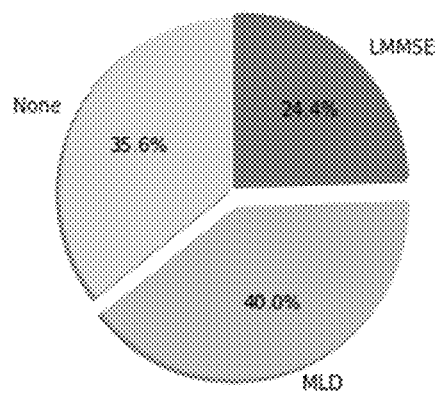
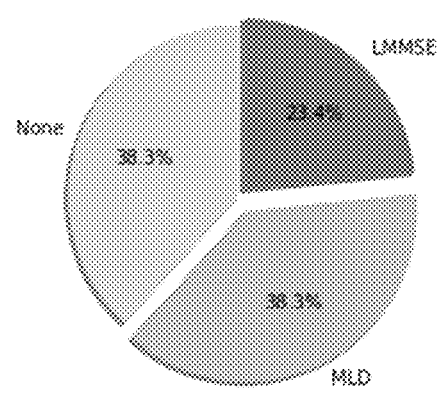
FIG. 10A
FIG. 10B

MIMO DETECTOR SELECTION

FIELD

The present specification relates to the selection of a detector in a Multiple Input Multiple Output (MIMO) system.

BACKGROUND

A detector of a MIMO system may be used for in the generation of estimates of transmitted bits. A number of possible detectors may be available for use, each having various advantages and disadvantages. There remains a need for further developments in this field.

SUMMARY

In a first aspect, this specification describes an apparatus (e.g. a receiver of a MIMO system) comprising means for performing: receiving transmissions over a channel at a receiver of a MIMO communication system, the transmissions being received from a plurality of transmitters in communication with the receiver, wherein each communication is a separate communication having a modulation and coding scheme; converting an estimate of the channel into an estimate, for each of a plurality of transmitters, of a bit-metric decoding rate (BMDR) for each of a plurality of available MIMO detectors; converting the estimated bit-metric decoding rate for each of the plurality of transmitters for each of the available MIMO detectors into an estimated bit error rate for each of the plurality of available MIMO detectors for each of the plurality of transmitters; and selecting one of said available MIMO detectors for use in generating log-likelihood ratios for bits transmitted from said plurality of transmitters to said receiver, wherein said one of said available MIMO detectors is selected based on the estimated bit-error rates and a target block error rate. The available MIMO detectors may, for example, include one or more of: MMSE, K-best detector and sphere detector algorithms, or variants thereof.

The receiver may be a base station of a MIMO communication system. Alternatively, for example, the transmissions may be received at a user device (e.g. a UE) with multiple antennas. The transmitters may be a plurality of user devices (e.g. UEs). Alternatively, for example, the plurality of transmissions may include a single user device (perhaps with multiple antennas) and/or a base station (perhaps with multiple antennas).

Some example embodiments include using a machine learning model (such as a neural network) to convert the estimate of the channel into said bit-metric decoding rate estimates. The machine learning model may be trained based, at least in part, on estimated bit-metric decoding rate and corresponding bit error rate values computed during a plurality of system simulations. Alternatively, for example, measurements from a real system may be used.

Some example embodiments include: obtaining an upper triangular matrix based on a QR decomposition of a channel matrix, wherein the channel matrix is an estimate of the channel; and using said machine learning model to convert the upper triangular matrix into said bit-metric decoding rate estimates. Some example embodiments include performing QR decomposition of the channel estimate to generate said upper triangular matrix. Alternatives to such arrangements exist, such as QL decomposition, and may be used in some example embodiments.

Some example embodiments include determining whether, for a particular one of the plurality of available MIMO detectors, the target block error rate is met for each transmission (e.g. for each user) and, if so, determining that said MIMO detector meets said target. Determining whether the particular one of the plurality of available MIMO detectors meets the target for a particular transmission may be based on whether an estimated bit-metric decoding rate is above a threshold. In some example embodiments, the means for selecting one of said available MIMO detectors selects one of said available MIMO detectors that meets said target for each of said transmissions. Selecting one of said available MIMO detectors may select a simplest one of said available MIMO detectors that meets said target for each transmission, although other selection criteria are possible.

The means for performing converting bit-metric decoding rate data into bit error rate data may comprise a lookup table. Some example embodiments further comprise: determining a configuration of the MIMO system; and selecting said lookup table from a plurality of available lookup tables based on said determined configuration.

Some example embodiments further comprise receiving or generating said channel matrix.

In some example embodiments, the means for performing selecting said one of said available MIMO detectors updates said selection each time the channel estimate is updated.

The said means may comprise: at least one processor; and at least one memory including computer program code, the at least one memory and the computer program configured, with the at least one processor, to cause the performance of the apparatus.

In a second aspect, this specification describes a method comprising: receiving transmissions over a channel at a receiver of a MIMO communication system, the transmissions being received from a plurality of transmitters in communication with the receiver, wherein each communication is a separate communication having a modulation and coding scheme; converting an estimate of the channel into an estimate, for each of a plurality of transmitters, of a bit-metric decoding rate for each of a plurality of available MIMO detectors; converting the estimated bit-metric decoding rate for each of the plurality of transmitters for each of the available MIMO detectors into an estimated bit error rate for each of the plurality of available MIMO detectors for each of the plurality of transmitters; and selecting one of said available MIMO detectors for use in generating log-likelihood ratios for bits transmitted from said plurality of transmitters to said receiver, wherein said one of said available MIMO detector is selected based on the estimated bit-error rates and a target block error rate.

The method may comprise using a machine learning model (such as a neural network) to convert the estimate of the channel into said bit-metric decoding rate estimates. The machine learning model may be trained based, at least in part, on estimated bit-metric decoding rate and corresponding bit error rate values computed during a plurality of system simulations. Alternatively, for example, measurement from a real system may be used.

The method may comprise: obtaining an upper triangular matrix based on a QR decomposition of a channel matrix, wherein the channel matrix is an estimate of the channel; and using said machine learning model to convert the upper triangular matrix into said bit-metric decoding rate estimates.

The method may comprise determining whether, for a particular one of the plurality of available MIMO detectors, the target block error rate is met for each transmission (e.g.

for each user) and, if so, determining that said MIMO detector meets said target. Determining whether the particular one of the plurality of available MIMO detectors meets the target for a particular transmission may be based on whether an estimated bit-metric decoding rate is above a threshold. In some example embodiments, the means for selecting one of said available MIMO detectors selects one of said available MIMO detectors that meets said target for each of said transmissions. Selecting one of said available MIMO detectors may select a simplest one of said available MIMO detectors that meets said target for each transmission, although other selection arrangements are possible.

Converting bit-metric decoding rate data into bit error rate data may comprise using a lookup table. Some example embodiments further comprise: determining a configuration of the MIMO system; and selecting said lookup table from a plurality of available lookup tables based on said determined configuration.

In a third aspect, this specification describes computer-readable instructions which, when executed by computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: receiving transmissions over a channel at a receiver of a MIMO communication system, the transmissions being received from a plurality of transmitters in communication with the receiver, wherein each communication is a separate communication having a modulation and coding scheme; converting an estimate of the channel into an estimate, for each of a plurality of transmitters, of a bit-metric decoding rate for each of a plurality of available MIMO detectors; converting the estimated bit-metric decoding rate for each of the plurality of transmitters for each of the available MIMO detectors into an estimated bit error rate for each of the plurality of available MIMO detectors for each of the plurality of transmitters; and selecting one of said available MIMO detectors for use in generating log-likelihood ratios for bits transmitted from said plurality of transmitters to said receiver, wherein said one of said available MIMO detector is selected based on the estimated bit-error rates and a target block error rate.

In a seventh aspect, this specification describes an apparatus comprising means (such as a receiver of a base station) for receiving transmissions over a channel at a receiver of a MIMO communication system, the transmissions being received from a plurality of transmitters in communication with the receiver, wherein each communication is a separate communication having a modulation and coding scheme; means (such as a machine learning module) for converting an estimate of the channel into an estimate, for each of a plurality of transmitters, of a bit-metric decoding rate for each of a plurality of available MIMO detectors; means (such as a lookup table) for converting the estimated bit-metric decoding rate for each of the plurality of transmitters for each of the available MIMO detectors into an estimated bit error rate for each of the plurality of available MIMO detectors for each of the plurality of transmitters; and means (such as a decision-making module) for selecting one of said available MIMO detectors for use in generating log-likelihood ratios for bits transmitted from said plurality of transmitters to said receiver, wherein said one of said available MIMO detector is selected based on the estimated bit-error rates and a target block error rate. The apparatus may further comprise means for performing (at least) any method as described with reference to the second aspect.

BRIEF DESCRIPTION OF THE DRAWINGS

Example embodiments will now be described, by way of example only, with reference to the following schematic drawings, in which:

FIGS. 9A and 9B are plots showing normalised absolute error of example simulations;

FIGS. 10A and 10B are plots showing performance of example detection selection simulations;

DETAILED DESCRIPTION

Figure 1:
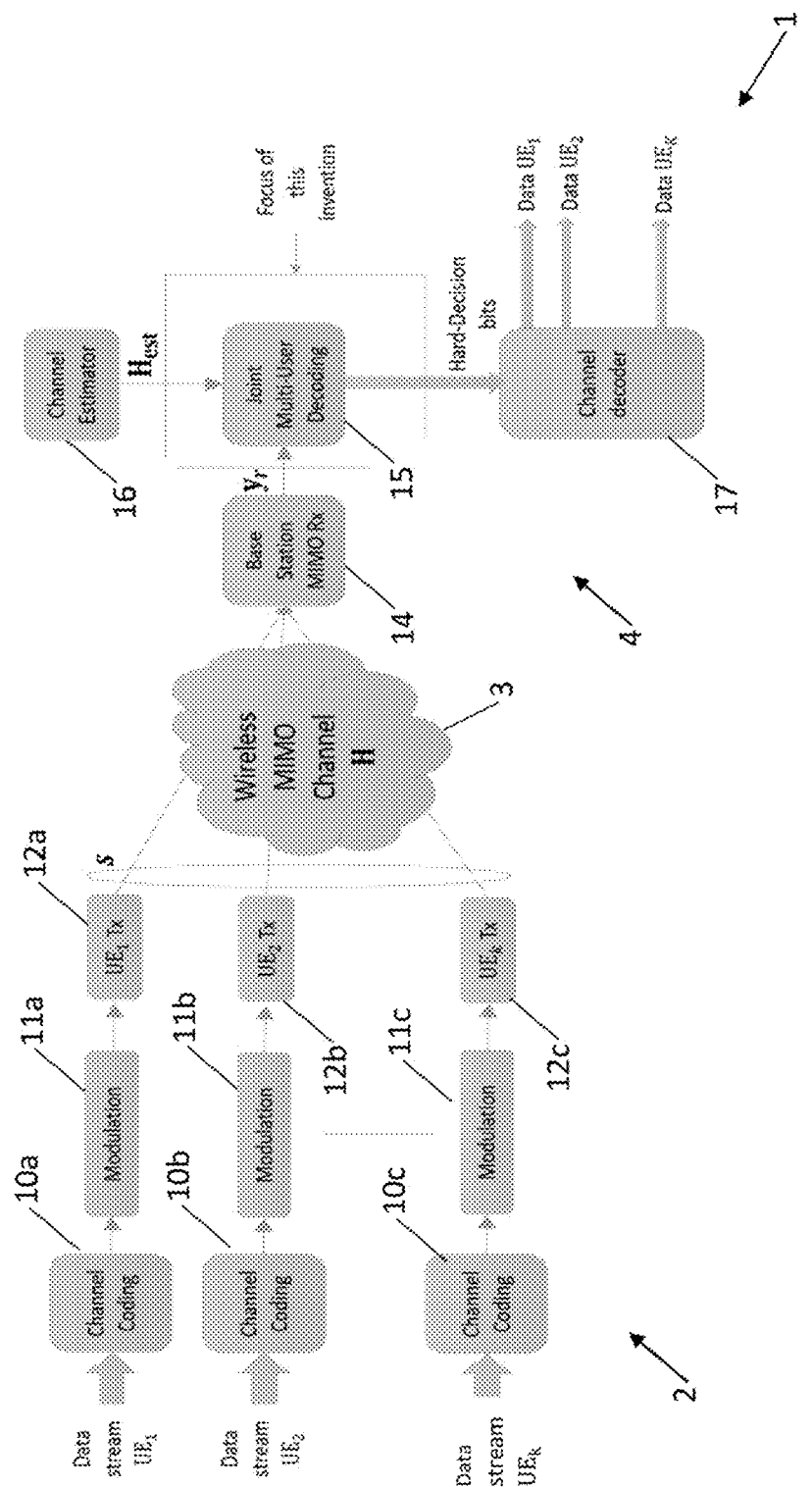
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 1, in accordance with an example embodiment. The system 1 is a wireless Multi-user Multi Input Multiple Output (MU-MIMO) system.

The system 1 comprises a transmitter section 2, a channel 3 and a receiver section 4.

The transmitter section 2 comprises a first channel coding module 10a, a first modulation module 11a and a first transmitter 12a. Similarly, the transmitter section comprises a second channel coding module 10b, a second modulation module 11b and a second transmitter 12b. Further, the transmitter section 2 comprises a third channel coding module 10*c*, a third modulation module 11*c* and a third transmitter 12*c*.

A first data stream is received from a first user equipment $UE_1$, a modulation and coding scheme is applied to the first data stream by the first channel coding module 10*a* and the first modulation module 11*a*, the encoded data stream is transmitted by the first transmitter 12*a* to the receiver section 4 over the channel 3.

Similarly, a second data stream is received from a second user equipment $UE_2$, a modulation and coding scheme is applied to the second data stream by the second channel coding module 10*b* and the second modulation module 11*b*, the encoded data stream is transmitted by the second transmitter 12*b* to the receiver section 4 over the channel 3.

Finally, a k-th data stream is received from a k-th user equipment $UE_k$, a modulation and coding scheme is applied to the k-th data stream by the third channel coding module 10*c* and the third modulation module 11*c*, the encoded data stream is transmitted by the third transmitter 12*c* to the receiver section 4 over the channel 3.

Of course, the system 1 could be provided with any number of data streams.

As shown in FIG. 1, the receiver section 4 comprises a MIMO receiver 14, a MIMO detector 15, a channel estimator 16 and a channel decoder 17. The MIMO receiver 14 may take the form of a base station of the transmission system 1. The MIMO receiver 14 provides a signal vector $y_r$ to the decoder 15. The MIMO receiver 14 also receives a channel estimate $H_{est}$ from the channel estimator 16.

On the basis of the signal vector $y_r$ and the channel estimate $H_{est}$, the MIMO detector 15 generates log-likelihood ratios (LLRs) for each transmitted bit. The channel decoder 17 converts the generated LLRs into estimates of the bits transmitted by the user devices $UE_1$, $UE_2$ ... $UE_k$.

There are several candidate detectors that may be used as the MIMO decoder 15, including the linear MMSE (LMMSE) detector, K-best detector, and the sphere detector (SD). The skilled person will be aware of further candidate detectors.

The LMMSE detector generally has the least complexity among the three but is also usually the least reliable in general. The sphere detector (SD) is a maximum-likelihood detector (MLD) and is generally the most complex but also the most reliable detector. The K-best detector is generally in between the two in terms of both complexity and reliability. However, depending on the channel realization, the LMMSE detector can perform nearly as well as MLD while the K-best detector can perform as well as MLD for a significant percentage of the time in practice. Moreover, many times it may be beneficial to trade-off error performance for ease of detection. For example, an application might be content with a block-error rate (BLER) of only $10^{-3}$ while MLD might offer a BLER of $10^{-6}$ for the signal-to-noise ratio (SNR) in context. In such a case, it might be prudent to use the LMMSE detector if it offers a BLER$\leq 10^{-3}$. The performance of each detector is dependent on the instantaneous channel realization and the SNR.

Figure 2:
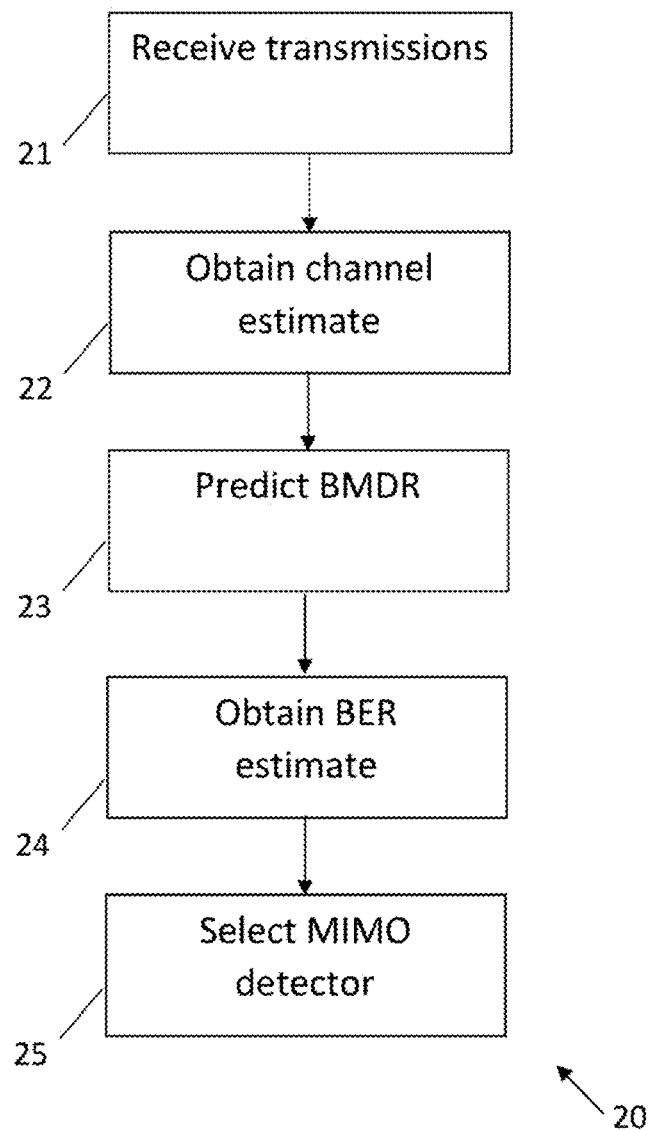
FIG. 2 is a flow chart showing an algorithm in accordance with an example embodiment.

FIG. 2 is a flow chart showing an algorithm, indicated generally by the reference numeral 20, in accordance with an example embodiment.

As discussed further below, the algorithm 20 may be used to select a detector from a suite of available detectors for the purpose of decoding data from $N_u$ multiple multi-antenna users (UEs) at a multi-antenna 5G base station. Variants of the algorithm 20 can be used in other circumstances. For example, although the algorithm 20 applies to the uplink transmission scenario, similar principles can be applied to downlink transmissions.

The algorithm 20 starts at operation 21, where transmissions are received over a channel (such as the channel 3) at a receiver (such as the receiver 14) of a MIMO communication system, the transmissions being received from a plurality of transmitters in communication with the receiver, wherein each communication is a separate communication having a modulation and coding scheme. The receiver may be a base station of a MIMO communication system. Alternatively, for example, the transmissions may be received at a user device (e.g. a UE) with multiple antenna. Similarly, although the plurality of transmitters may be a plurality of user devices. Alternatively, for example, the plurality of transmitters may include a single user device (perhaps with multiple antennas) and/or a base station (perhaps with multiple antennas). Thus, the principles described herein are applicable to many variants of the transmission system 1.

At operation 22, an estimate of the channel is obtained. In the example system 1, the channel estimate may be generated by the channel estimator 16, but many alternative arrangements are possible. Indeed, the operation 22 may be omitted if a channel estimate is already available.

At operation 23, the estimate of the channel is converted into an estimate, for each of a plurality of transmitters, of a bit-metric decoding rate (BMDR) for each of a plurality of available MIMO detectors, as discussed in detail below.

At operation 24, the estimated bit-metric decoding rate (BMDR) for each of the plurality of transmitters for each of the available MIMO detectors is converted into an estimated bit error rate (BER) for each of the plurality of available MIMO detectors for each of the plurality of transmitters.

At operation 25, one of said available MIMO detectors is selected for use in generating log-likelihood ratios (LLRs) for bits transmitted from said plurality of transmitters to said receiver. The MIMO detector is selected based on the estimated bit-error rates and a target block error rate. As discussed further below, the least complex detector of the available MIMO detectors may be selected (e.g. the least complex detector that meets a number of requirements).

As discussed further below, the algorithm 20 may be applied to the system 1 described above; however, alternative implementations of the algorithm 20 are possible.

In the system 1, let $\{UE_1, UE_2, \ldots, UE_N\}$ be the $N_u$ UEs scheduled in a given transmission time interval (TTI) in a given cell in the uplink in MU-MIMO mode (i.e. these UEs are scheduled on the same resource blocks). Let $N_r$ be the number of Rx inputs at the receiver/base station and $N_t^{(k)}$ be the number of transmit antennas at $UE_k$, k=1,2, ..., $N_u$. Further, let $N = \Sigma_k N_t^{(k)}$.

Each UE performs a channel coding of the information bits and then maps the coded bits to modulation symbols. This is done according to the Modulation and Coding Scheme (MCS) for uplink transmissions (e.g. using the coding modules 10 and the modulation modules 11 described above). Each UE transmits a block of modulated symbols over spatial streams and this block of modulated symbols is received at the receiver 14. The notation described below is applicable for every received symbol within a code block.

Without loss of generality, we can assume that $UE_k$ transmits $N_t^{(k)}$ number of modulated data streams (which we also refer to as "layer"). We assume that $N_r \geq N$. In this document, we assume that all the UEs employ the same QAM constellation $Q$, but a generalization to the case where each constellation size is different is not difficult. The size of $Q$ is M and its value is known at the BS. $Q$ is a Cartesian product of two PAM constellation of size $\sqrt{M}$ each, denoted by $\mathcal{P}$.

Let $H_k$ be the $N_r \times N_t^{(k)}$ channel matrix representing the channel between $UE_k$ and the BS. Let $$y_r = Hs + n_{int} + n_{AWGN} \quad (1)$$

Where:
$y_r \in \mathbb{C}^{N_r \times 1}$ is the signal received at the receiver/base station (BS) from all the UEs
$H = [H_1 \ldots H_{N_u}] \in \mathbb{C}^{N_r \times N}$ is the concatenated channel matrix
$n_{AWGN}$ is the additive white Gaussian noise at the receiver
$n_{int}$ is the co-channel interference from other cells, and
$s = [s_1^T, s_2^T, \ldots, s_{N_u}^T]^T \in Q^{N \times 1}$ is the cumulative signal vector transmitted by all the $N_u$ UEs.

The signal-to-interference-noise ratio (SINR) is given by:

$$\rho = \frac{\mathbb{E}\{\|Hs\|^2\}}{\mathbb{E}\{\|n_{int} + n_{AWGN}\|^2\}}.$$

The pre-processing stage may consist of: noise whitening; complex-to-real conversion and QR decomposition, as discussed further below.

Noise-whitening is performed to whiten the AWGN+co-channel interference. The result is $$\bar{y} = \bar{H}s + \bar{n} \quad (2)$$

where, due to whitening, the effective noise and interference term $\bar{n}$ is now approximately transformed into white noise with variance $\sigma^2$ per complex dimension. The effective SINR is:

$$\rho = \frac{\mathbb{E}\{\|\bar{H}s\|^2\}}{\mathbb{E}\{\|\bar{n}\|^2\}} = \frac{P\|\bar{H}\|_F^2}{N_r \sigma^2} \quad (3)$$

where P is the average energy of the QAM constellation and $\|\bar{H}\|_F$ is the Frobenius norm of $\bar{H}$.

The model in (2) is converted to its real equivalent (in the complex-to-real conversion) to obtain:

$$\tilde{y} = \tilde{H}\tilde{s} + \tilde{n} \quad (4)$$

where $\tilde{y} \in \mathbb{R}^{2N_r \times 1}$, $\tilde{H} \in \mathbb{R}^{2N_r \times 2N}$, $\tilde{s} \in \mathbb{R}^{2N \times 1}$, $\tilde{n} \in \mathbb{R}^{2N_r \times 1}$ is real AWGN.

The QR decomposition of $\tilde{H}$ is performed to obtain $\tilde{H} = QR$ where $Q \in \mathbb{R}^{N_r \times N}$ is orthogonal and $R \in \mathbb{R}^{2N \times 2N}$ is upper-triangular matrix (as discussed further below). Next, we obtain $y \stackrel{\text{def}}{=} Q^T \tilde{y}$ to get $$y = Rs + n, y \in \mathbb{R}^{2N \times 1}, R \in \mathbb{R}^{2N \times 2N}, s \in \mathcal{P}^{2N \times 1}, n \in \mathbb{R}^{2N \times 1} \quad (5)$$

where $n = Q^T \tilde{n}$ continues to be white due to the orthogonality of Q.

As discussed above, the algorithm 20 generates an estimate, for each of a plurality of transmitters, of a bit-metric decoding rate (BMDR) for each of a plurality of available MIMO detectors. Bit-metric decoding rate is discussed further below.

Since User k transmits $N_t^{(k)}$ symbols from an M-QAM, it encodes $n_k \stackrel{\text{def}}{=} N_t^{(k)} \log_2 M$ bits per transmission. Let the vector of these bits be denoted by $b_k = [b_{1,k} b_{2,k}, \ldots, b_{n_k,k}]$.

Then, conditioned on a channel H, the bit-metric decoding rate (BMDR) associated with a detector $\mathcal{D}$ for User k at an SINR of $\rho$ is defined as:

$$BMDR_{\mathcal{D}}^{(k)}(\rho, H) \stackrel{\text{def}}{=} \quad (6)$$

$$1 - \mathbb{E}_{n,b_k}\left\{\frac{1}{n_k}\sum_{i=1}^{n_k} CE(b_{i,k}, \sigma(LLR_{\mathcal{D}}(b_{i,k}, \rho, H))) \,\Big|\, H\right\}$$

Where:
LLR $\mathcal{D}(b_{i,k}, \rho, H)$ is the LLR for the $i^{th}$ bit of User k using the detector $\mathcal{D}$
$\sigma(.)$ is the sigmoid function
CE(.) is the binary cross-entropy function, respectively given as;

$$LLR_{\mathcal{D}}(b_{i,k}, \rho, H) \stackrel{\text{def}}{=} \log\left[\frac{Pr(b_{i,k} = 1 \mid y_r, H)}{Pr(b_{i,k} = 0 \mid y_r, H)}\right], \quad (7)$$

$$\sigma(x) \stackrel{\text{def}}{=} \frac{1}{1 + \exp(-x)}, \quad (8)$$

$$CE(a,b) \stackrel{\text{def}}{=} -a \log b - (1-a)\log(1-b). \quad (9)$$

In (6), $\mathbb{E}_{n,b_k}\{.\}$ denotes the expectation over noise n and the bit-stream $b_k$. The BMDR is a value between 0 and 1 and is dependent on the SINR $\rho$ through the channel matrix H and the variance of the noise n. It is also monotonically increasing with $\rho$. For a multi-user MIMO system, the BMDR of a user depends on the following:

Detector choice: This is clear from (7) because the detector influences the ratio.

Signal-to-interference noise ratio: The BMDR monotonically increases with the SINR/SNR.

Condition number $\kappa$ of the channel: The condition number of the channel H is given as:

$$\kappa \stackrel{\text{def}}{=} 20 \log_{10}(\mathcal{S}_1 / \mathcal{S}_N) dB \quad (10)$$

where $\mathcal{S}_1$ and $\mathcal{S}_N$ are respectively the maximum and minimum non-zero singular values of H (assuming a full column rank of N).

Well-conditioned channels have $\kappa \leq 10$ dB while channels with $\kappa \geq 20$ dB are considered ill-suited for MIMO transmission.

Off-diagonal elements of R: Since R is upper-triangular, its upper off-diagonal elements capture the amount of inter-symbol interference, and consequently play a decisive role in the resulting BMDR for each user.

Constellation size M: The size of the constellation influences the LLR and hence, the BMDR.

In the algorithm 20, the estimated bit-metric decoding rate (BMDR) for each of the plurality of transmitters for each of the available MIMO detectors is converted into an estimated bit error rate (BER) for each of the plurality of available MIMO detectors for each of the plurality of transmitters. The relationship between BMDR and achievable BER is discussed further below.

Figure 3:
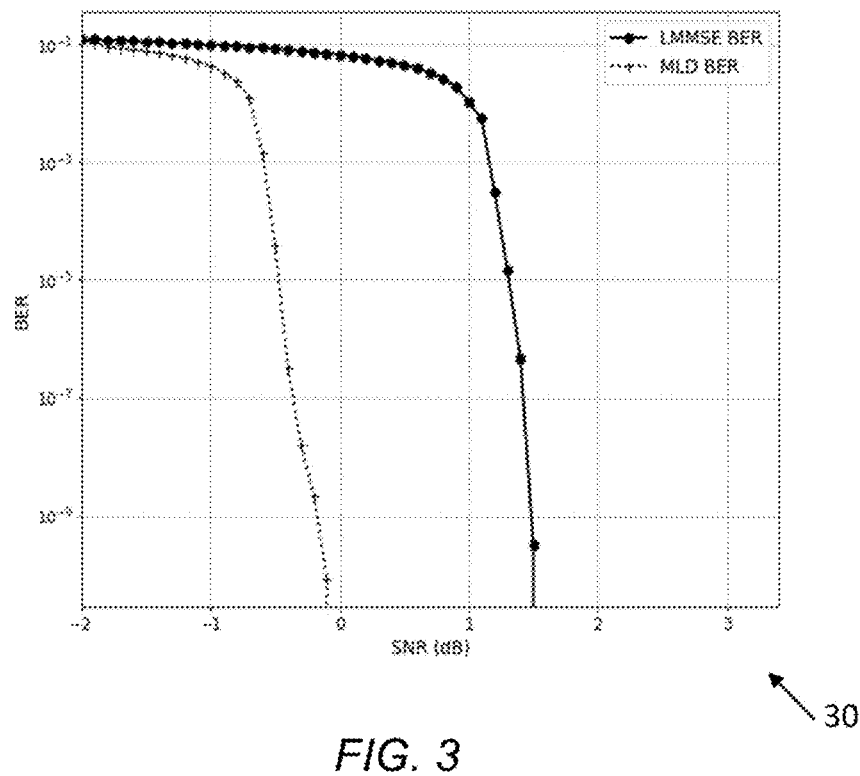
FIGS. 3 and 4 are plots demonstrating aspects of example embodiments.

FIG. 3 is a plot, indicated generally by the reference numeral 30, demonstrating aspects of an example embodiment. The plot shows coded BER for LMMSE and MLD decoders for a channel with $\kappa = 17.93$ dB.

Figure 4:
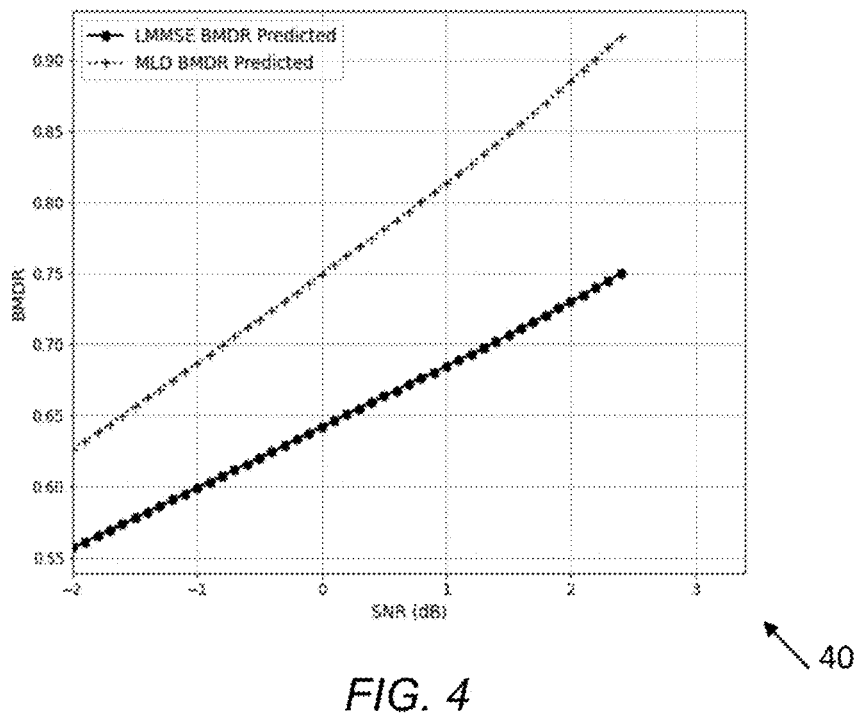

FIG. 4 is a plot, indicated generally by the reference numeral 40, demonstrating aspects of an example embodiment. The plot 40 shows empirically estimated BMDR for the same channel as in the plot 30.

Suppose that a channel code ($\mathcal{C}$ ($r^{(k)}$) of rate $r^{(k)}$ is used for User k. Let $\rho_{min}^{(k)}$($\mathcal{D}$, x) be the minimum (infimum) SNR (or SINR) at which BMDR $\mathcal{D}^{(k)}$($\rho$, H) is at least x, for some x∈(0,1). That is, MDR $\mathcal{D}^{(k)}$($\rho$, H)<x, $\forall \rho < \rho_{min}^{(k)}$ ($\mathcal{D}$, x). Then, a lower bound on the minimum SNR $\rho_{thrsh}^{(k)}$ ($\mathcal{D}$, $\mathcal{C}$ ($r^{(k)}$)) required to achieve a BER arbitrarily close to 0 with $\mathcal{C}$ ($r^{(k)}$) is $\rho_{min}^{(k)}$ ($\mathcal{D}$, $r^{(k)}$). Therefore, $$\rho_{thrsh}^{(k)}(\mathcal{D}, \mathcal{C}(r^{(k)})) \geq \rho_{min}^{(k)}(\mathcal{D}, r^{(k)}). \quad (11)$$

Typically, for every $\mathcal{C}$ ($r^{(k)}$), there exists a margin $\delta(\mathcal{C}(r^{(k)})) \geq 0$ for the BMDR such that $$\rho_{min}^{(k)}(\mathcal{D}, r^{(k)}) + \delta(\mathcal{C}(r^{(k)})) = \rho_{thrsh}^{(k)}(\mathcal{D}, \mathcal{C}(r^{(k)})). \quad (12)$$

For an ideal outer code $\mathcal{C}^*(r^{(k)})$ with infinite block length, it follows that $\delta(\mathcal{C}(r^{(k)})) = 0$. It is clear that the BMDR is a good predictor of the performance of a code with a detector $\mathcal{D}$, and this is further illustrated in FIGS. 3 and 4. In those Figures, it can be observed that the BER for MLD sees a waterfall slope at around 0.4 dB and that for the LMMSE detector sees the same at around 1.2 dB for a single user 4×16 MIMO system ($N_r$=16, N=4). A Rate-2/3 dvbs2ldpc code of length 64800 was used to plot the coded BER. The BMDR which corresponds to these SNR values can be observed to be between 0.69-0.72. So, we can conclude that for this particular channel and channel code, $$\rho_{thrsh}(MLD, \mathcal{C}(2/3)) \approx 0.4 \text{ dB}, \rho_{thrsh}(LMMSE, \mathcal{C}(2/3)) \approx 1.2 \text{ dB}, \delta(\mathcal{C}(2/3)) \approx 0.4$$

Figure 5:
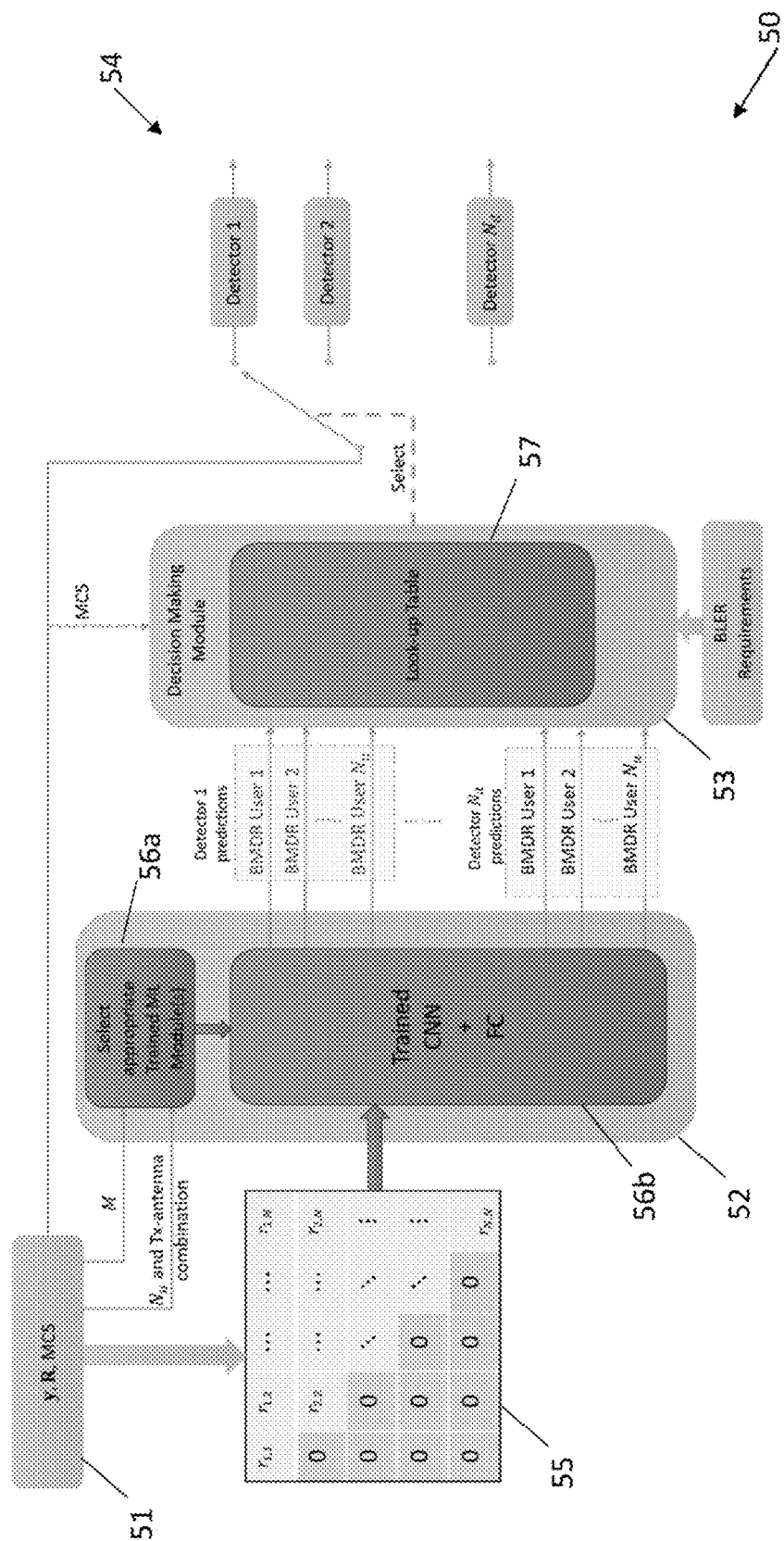
FIG. 5 is a block diagram of a system in accordance with an example embodiment.

FIG. 5 is a block diagram of a system, indicated generally by the reference numeral 50, in accordance with an example embodiment.

The system 50 comprises a receiver module 51, a BMDR generator 52 and a decision-making module 53. The decision-making module 53 selects one of a plurality of detectors indicated generally by the reference numeral 54.

The plurality of detectors 54 comprise $N_d$ detectors $\{\mathcal{D}(i)\}_{i=1}^{N_d}$ having varying complexity and error handling capabilities. The detectors may be ordered in the increasing order of complexity and/or in decreasing order of reliability. Usually, the number of antennas at the receiver $N_r$ is fixed, so only different combinations of N, $n_u$ and $\{N_t^{(k)}\}_{k=1}^{N_u}$ need to be considered while selecting the channel realizations for training. We detail the training process below for a chosen combination of N, $n_u$ and $\{N_t^{(k)}\}_{k=1}^{N_u}$.

The receiver module 51 receives the signal vector y transmitted over the channel of the MIMO communication system and also obtains information relating the modulation and coding scheme (MCS) used. The receiver module 51 obtains the channel estimate, perform a QR decomposition of the channel estimate and provides the upper-triangular R matrix to the BMDR generator 52. An example R matrix 55 is shown in FIG. 5.

The BMDR generator 52 includes a machine learning (ML) module selector 56a and a selected machine learning module in the form of a trained convolutional neural network (CNN) 56b. The CNN 56b is used to predict the bit-metric-decoding rate (BMDR) for each user and for each available detector. Mechanisms for training the CNN 56b are discussed further below.

The ML module selector 56a receives data relating to a configuration of the relevant MIMO system. For example, as shown in the system 50, the ML module selector may receive (from the receiver module 51) information such as constellation size M of the MCS, a number of user devices $N_u$ and details of the Tx-antenna combination being used.

Based on the MIMO system configuration, one of a number of trained ML modules may be used to implement the CNN 56b.

The CNN 56b uses a machine learning model converting an estimate of the channel into an estimate, for each of a plurality of transmitters, of a bit-metric decoding rate (BMDR) for each of a plurality of available MIMO detectors. Specifically, as shown in the system 50, the CNN 56b converts the upper triangular matrix 55 into said bit-metric decoding rate estimates. Using the upper-triangular R matrix of the channel estimate as an input to a CNN captures all the features required to accurately predict the BMDR. However, it should be noted alternatives to QR decomposition (such as QL decomposition) are possible.

The decision-making module 53 comprises a look-up table (LUT) 57 and receives BLER requirements (e.g. a target BLER). The look-up-table 57 may be used to convert the estimated bit-metric decoding rate for each of the plurality of transmitters for each of the available MIMO detectors into an estimated bit error rate for each of the plurality of available MIMO detectors for each of the plurality of transmitters.

Based on the predicted BMDRs, the decision-making module 53 make use of the look-up table 57 to select a detector from the plurality of available detectors 54. The selected detector may, for example, be the least complex detector that meets the BLER requirements. There is a strong relationship between BMDR and the BLER of a detection algorithm in the presence of a channel code. So, using BMDR as the defining feature for detector selection may lead to better accuracy.

An offline training phase may be used to train at least some of the elements of the system 50, as discussed further below.

A set of MIMO channel realizations $\mathbb{H}$ (N, $n_u$, $\{N_t^{(k)}\}_{k=1}^{N_u}$) with condition numbers ranging from 0 to 25 dB (uniformly sampled) may be chosen, for example according to a predetermined channel model or from real-world data. We have used the notationiii $\mathbb{H}$ (N, $n_u$, $\{N_t^{(k)}\}_{k=1}^{N_u}$) to denote that the set is parameterized by N, $n_u$, and $\{N_t^{(k)}\}_{k=1}^{N_u}$.

Every element of $\mathbb{H}$ (N, $n_u$, $\{N_t^{(k)}\}_{k=1}^{N_u}$) is normalized to have unit Frobenius norm. Next, we consider all possible QAM constellations that are employed in the system. For example, the values of the constellation size M are 4, 16, 64 and 256 for 5G. For each constellation, a range of useful SNR values in dB is determined to be [$\rho_{min}(M)$, $\rho_{max}(M)$]. Note that this range is dependent on M because the useful range of SNR for a lower order constellation may be lower than the useful range of values for a higher order constellation. A set of SNR values denoted by $P_M$ is obtained by sampling from [$\rho_{min}(M)$, $\rho_{max}(M)$] at uniform discrete intervals with a predetermined level of granularity. Next, a set of effective channel realizations $$\mathcal{H}(N, n_u, \{N_t^{(k)}\}_{k=1}^{N_u}, M) \stackrel{def}{=}$$
$$\{\sqrt{(N_r 10^{(\rho/10)}/P)} H, \; \forall \rho \in P_M, \forall H \in \mathbb{H}(N, n_u, \{N_t^{(k)}\}_{k=1}^{N_u})\}$$

is obtained with P being the average energy of M-QAM. From (3), the scalar $\sqrt{(N_r 10^{(\rho/10)}/P)}$ ensures that the SNR (dB) when $\sqrt{(N_r 10^{(\rho/10)}/P)}H$ is the effective channel for transmission and the noise variance is unity per complex dimension is $\rho$ dB. We have used the notation $\mathcal{H}$ (N, $n_u$, $\{N_t^{(k)}\}_{k=1}^{N_u}$, M) to denote that the set is parameterized by N, $n_u$, $\{N_t^{(k)}\}_{k=1}^{N_u}$ and M.

For every set $\mathcal{H}$ (N, $n_u$, $\{N_t^{(k)}\}_{k=1}^{N_u}$, M) and for every $H_e \in \mathcal{H}$ (N, $n_u$, $\{N_t^{(k)}\}_{k=1}^{N_u}$, M), BMDRs for each user is approximated for each decoder D(i), i ∈ {1,2, ..., $N_d$} by averaging over several realizations of AWGN noise (with unit variance) and input bit-streams according to the channel model given in (2). We denote this resulting set of BMDRs by $$\mathcal{B}(N, n_u, \{N_t^{(k)}\}_{k=1}^{N_u}, M) = \{BMDR(H_i), \forall H_i \in \mathcal{H}(N, n_u, \{N_t^{(k)}\}_{k=1}^{N_u}, M)\}.$$

To be clear, each BMDR($H_i$) is a tuple of $N_D$ elements denoted by (BMDR $\mathcal{D}_{(1)}(H_i)$, ..., BMDR $\mathcal{D}_{(N_d)}(H_i)$), and each element of the tuple is given as $$BMDR_{\mathcal{D}(l)}(H_i) = [BMDR_{\mathcal{D}(l)}^{(1)}(H_i), \ldots, BMDR_{\mathcal{D}(l)}^{(N_u)}(H_i)] \in (0, 1)^{N_u \times 1},$$

$$\forall l \in \{1, 2, \ldots, N_d\}.$$

We have omitted the usage of ρ to parameterize BMDR $\mathcal{D}_{(l)}^{(1)}(H_i)$ because the noise variance is unity and ρ is completely determined by $\|H_i\|_F$.

Every element $H_i \in \mathcal{H}(N, n_u, N_t^{(k)}, M)$ is a complex matrix of size ($N_r$, N) and may be converted to a real-valued matrix $\mathcal{R}e(H_i) \in \mathbb{R}^{2N_r \times 2N}$ as $$\mathcal{R}e(H_i) = \begin{bmatrix} \mathfrak{R}(H_i) & -\mathfrak{I}(H_i) \\ \mathfrak{I}(H_i) & \mathfrak{R}(H_i) \end{bmatrix}$$

where $\mathfrak{R}(H_i)$ and $\mathfrak{I}(H_i)$ respectively generate the entry-wise real and imaginary parts of $H_i$. Next, the QR decomposition of $\mathcal{R}e(H_i)$ is performed to obtain $\mathcal{R}e(H_i) = Q_i R_i$ where $Q_i \in \mathbb{R}^{N_r \times N}$ is orthogonal and $R_i \in \mathbb{R}^{N \times N}$ is upper-triangular. The inputs of the training dataset for a combination of N, $n_u$, $N_t^{(k)}$, M is given by:

$$X_{train} = \{R_i | \mathcal{R}e(H_i) = Q_i R_i, \forall H_i \in \mathcal{H}(N, n_u, N_t^{(k)}, M)\}. \quad (13)$$

The labels are $$Y_{train} = \{BMDR(R_i), \forall R_i \in X_{train}\} \quad (14)$$

where BMDR($R_i$)=BMDR($H_i$) when $\mathcal{R}e(H_i)=Q_i R_i$ with $Q_i$ orthogonal. Each training sample is the pair ($R_i$, BMDR($R_i$)) and the entire labelled dataset is given by $$\mathbb{L} = \{(R_i, BMDR(R_i)), \forall R_i \in X_{train}\}.$$

We note that the BMDR($R_i$) is the same as BMDR ($D_1 R_i D_2$), where $D_1$ and $D_2$ are arbitrary diagonal matrices with ±1 entries. The invariance due to $D_2$ is because of the symmetry of PAM constellations (whose effect is evident from (5) and (6)), and the invariance due to $D_1$ is because if $Q_i$ is orthogonal, so is $Q_i D_1$, and $\mathcal{R}e(H_i) = Q_i R_i = Q_i D_1 D_1 R_i$. This property may be used while training the CNN 56b for increasing the speed of training and for increased robustness in making predictions.

We denote the CNN to be trained by $f_\theta$ where θ denotes the vector of trainable parameters of the CNN. Likewise, let $f_\theta(R)$ denote the output of the CNN when its input is R. The CNN has $N_D N_u$ outputs that predict the BMDRs of each user and for each detector, and let $f_\theta \mathcal{D}_{(j)}^{(k)}(R)$ denote the output associated with the BMDR prediction of User k and Detector $\mathcal{D}(j)$. At the beginning of each training epoch, $\mathbb{L}$ is randomly shuffled and split into several mini batches of size B (except possibly the last mini batch which can have smaller size). Every mini batch $\mathbb{L}_B \subset \mathbb{L}$ is then used to perform one step of optimization of the CNN. For every ($R_i$, BMDR($R_i$)) $\in \mathbb{L}_B$, we also consider ($D_{1,i} R_i$, BMDR($R_i$)) and ($R_i D_{2,i}$, BMDR($R_i$)) in the same optimization step of the CNN with its trainable parameters unaltered. The diagonal matrices $D_{1,i}$ and $D_{2,i}$ with random ±1 entries are chosen independently of other samples at random. The training loss (which is based on the normalized mean absolute deviation) for the labelled pair ($R_i$, BMDR($R_i$)) in the mini batch is $$\mathcal{L}_\theta(R_i, BMDR(R_i)) = \sum_{j=1}^{N_D} \sum_{k=1}^{N_u} \frac{|BMDR_{\mathcal{D}(j)}^{(k)}(R_i) - f_{\theta,\mathcal{D}(j)}^{(k)}(R_i)| + |BMDR_{\mathcal{D}(j)}^{(k)}(R_i) - f_{\theta,\mathcal{D}(j)}^{(k)}(D_{1,i} R_i)|}{|BMDR_{\mathcal{D}(j)}^{(k)}(R_i)|} \quad (15)$$

The overall loss for the mini batch is $$\mathcal{L}_B = 1/3B \Sigma_{R_i \in X_B} \mathcal{L}_\theta(R_i, BMDR(R_i)). \quad (16)$$

An optimization step is performed on the loss $\mathcal{L}_B$ and the parameters θ of the CNN are updated after which the next mini batch is considered for training. This is repeated until all the mini batches have been used up and subsequently, the next epoch commences.

In some example embodiments, separate CNNs might be trained for each user (and may be selected for use by the module 56a), and for each combination of N, $N_u$, $\{N_t^{(k)}\}_{k=1}^{N_u}$ and M. In such a case, the values of N, $N_u$, $\{N_t^{(k)}\}_{k=1}^{N_u}$, k, and M decide which model to use. In other embodiments, a single CNN might be trained for all the users using the entire dataset that consists of all the individual datasets for each combination of N, $N_u$, $\{N_t^{(k)}\}_{k=1}^{N_u}$ and M. In this case, the input to the model would also include the values of N, $N_u$, $\{N_t^{(k)}\}_{k=1}^{N_u}$ and M. It is likely that the former case would lead to more accurate predictions.

Figure 6:
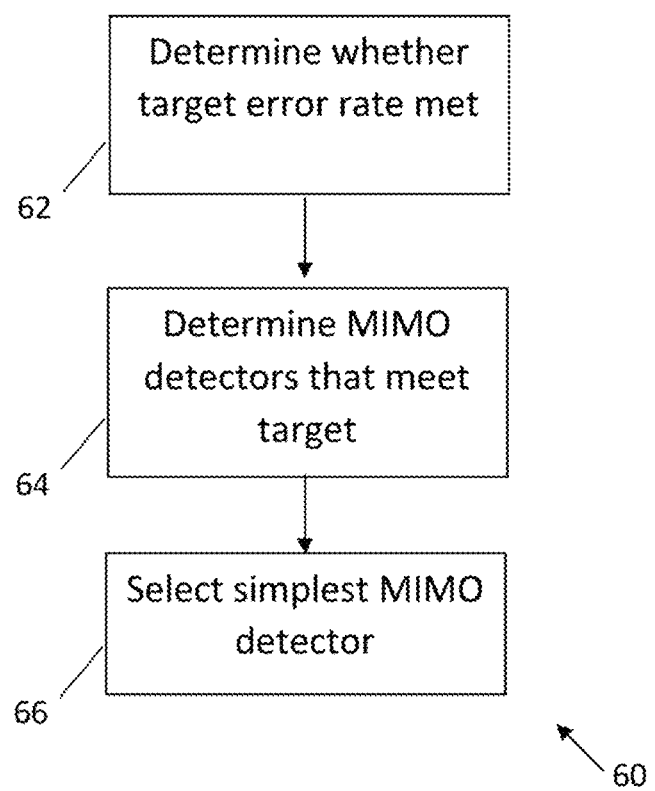
FIGS. 6 to 8 are flow charts showing algorithms in accordance with example embodiments.

FIG. 6 is a flow chart showing an algorithm, indicated generally by the reference numeral 60, in accordance with an example embodiment.

The algorithm 60 starts at operation 62, where a determination is made regarding whether, for a particular one of a plurality of available MIMO detectors, the target block error rate is met for each transmission (e.g. for each user) and, if so, determining that said MIMO detector meets said target.

At operation 64, a determination is made regarding which of a number of candidate MIMO detectors (such as the detectors 54) meets a block error rate target.

At operation 66, one of the MIMO detectors that has been determined in the operation 64 to meet the block error rate target is selected. In the specific example algorithm 60, the simplest MIMO detector to meet the target is selected for use.

The detector selection may be performed (in real-time) once every few symbols $N_s$, and the same chosen detector is used for a few consecutive subcarriers $N_f$. This means that the same detector can be used for a grid of $N_f N_s$ resource elements in an OFDM subframe. The choices of $N_f$ and $N_s$ may be dependent respectively on the delay spread and the Doppler shift. One can use a neural network to predict the optimal values of $N_f$ and $N_s$. Or alternatively, the delay-spread and Doppler shift can be estimated, and a look-up table can be used to determine the optimal values of these.

Upon receiving the signal vector $y_r$ as given in (1), the sequence of steps from (2)-(5) is performed. The noise variance is estimated, and a normalization is performed to get $$y = Rs + n, y \in \mathbb{R}^{2N \times 1}, R \in \mathbb{R}^{2N \times 2N}, s \in \mathcal{R}^{2N \times 1}, n \in \mathbb{R}^{2N \times 1}$$

where n is real AWGN with variance 0.5 due to normalization. This normalization is necessary because the CNN was trained with such an assumption on the noise variance. Next, the upper-triangular matrix R is input to the trained CNN which outputs the BMDR estimates for each user and for each detector, denoted by $\widehat{BMDR}\ \mathcal{D}_{(i)}^{(k)}$ (R), $i \in \{1, 2, \ldots, N_d\}$, $k \in \{1, \ldots, N_u\}$. In particular, $$\widehat{BMDR}\ \mathcal{D}_{(j)}^{(k)}(R) \stackrel{def}{=} f_\theta, \mathcal{D}_{(j)}^{(k)}.$$

As before, let $r^{(k)}$ denote the rate of the LDPC code used for User k. Both $r^{(k)}$ and M are defined by the MCS level. A look-up table will have the stored values of $\delta(\mathcal{C}(r^{(k)}))$ which are estimated apriori using the definition given in (12) for LDPC code rate $r^{(k)}$.

Figure 7:
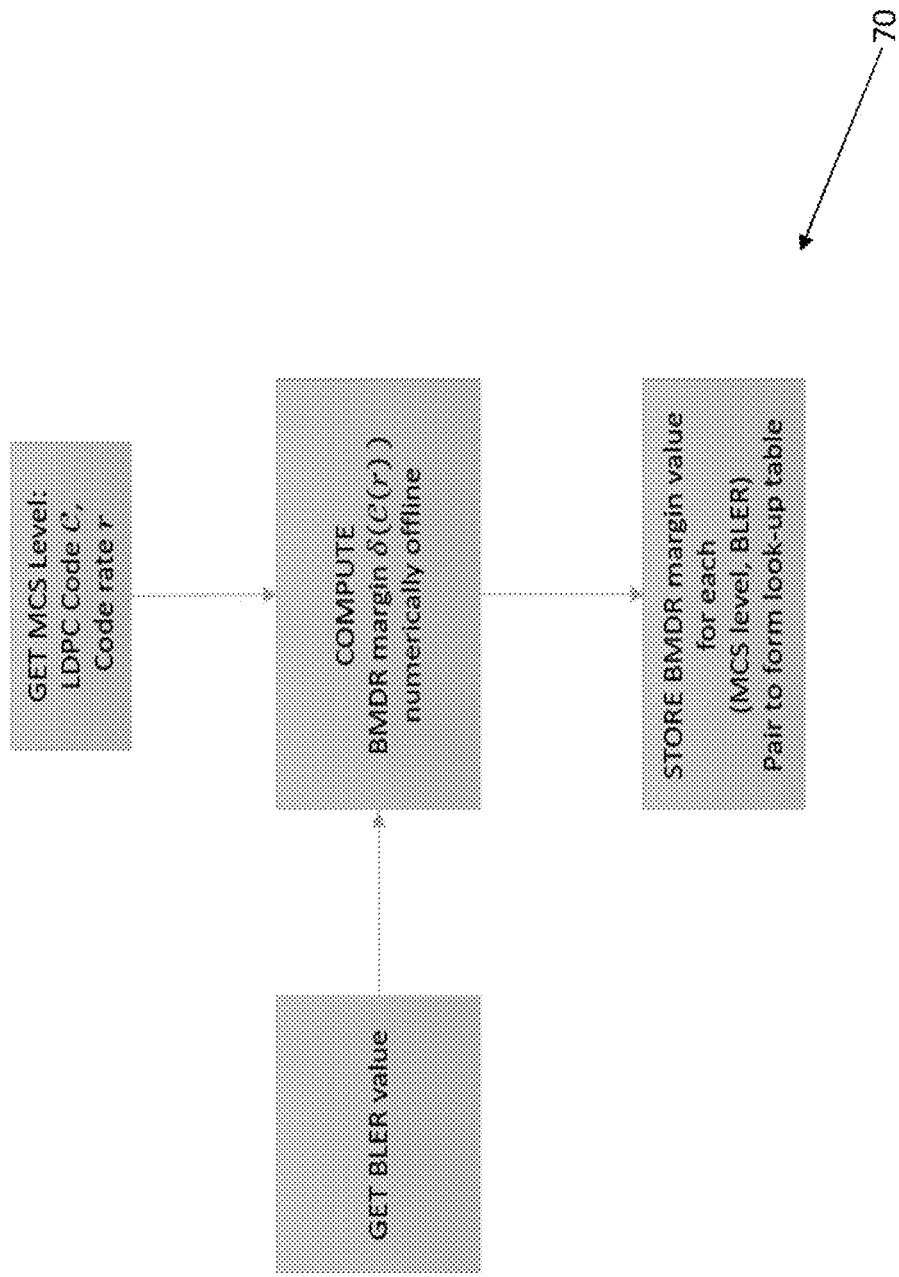

FIG. 7 is a flow chart showing an algorithm, indicated generally by the reference numeral 70, in accordance with an example embodiment. The algorithm 70 shows an example of how the look-up table may be created.

The margin values are those corresponding to the required BLER. As mentioned before, the detectors are arranged in the increasing order of complexity, so $\mathcal{D}(i)$ is less complex than $\mathcal{D}(j)$ if i<j (and less reliable as well).

If there exists at least one $k \in \{1, 2, \ldots, N_u\}$ such that for some $\mathcal{D}(i)$, $\widehat{BMDR}\ \mathcal{D}_{(i)}^{(k)}(R) \geq r^{(k)} + \delta(\mathcal{C}(r^{(k)}))$, then choose the least complex $\mathcal{D}(i)$ for which the highest number of users satisfy $\widehat{BMDR}\ \mathcal{D}_{(i)}^{(k)}(R) \geq r^{(k)} + \delta(\mathcal{C}(r^{(k)}))$. In other words, choose $\mathcal{D}(\hat{z})$ where $$\hat{z} = \min\left\{ i \in \{1, 2, \ldots, N_d\} \Bigg| \sum_{k=1}^{N_u} 1_{\{\widehat{BMDR}_{\mathcal{D}(i)}^{(k)}(R) \geq r^{(k)} + \delta(\mathcal{C}(r^{(k)}))\}} = c \right\}, \quad (17)$$

$$c = \max_{i \in \{1,2,\ldots,N_d\}} \left\{ \sum_{k=1}^{N_u} 1_{\{\widehat{BMDR}_{\mathcal{D}(i)}^{(k)}(R) \geq r^{(k)} + \delta(\mathcal{C}(r^{(k)}))\}} \right\}$$

with $1_{\{A\}}$ denoting the indicator of the event A and equals 1 if A occurs, 0 otherwise.

If no such k exists, then there are two possibilities to choose the detector. Choose $\mathcal{D}(1)$: This means that the least complexity detector is chosen since no detector is useful anyway.

Choose $\mathcal{D}(N_d)$: This means that the most complex decoder with the best BMDRs for each user is selected. This could potentially be useful in the case of HARQ retransmissions.

Figure 8:
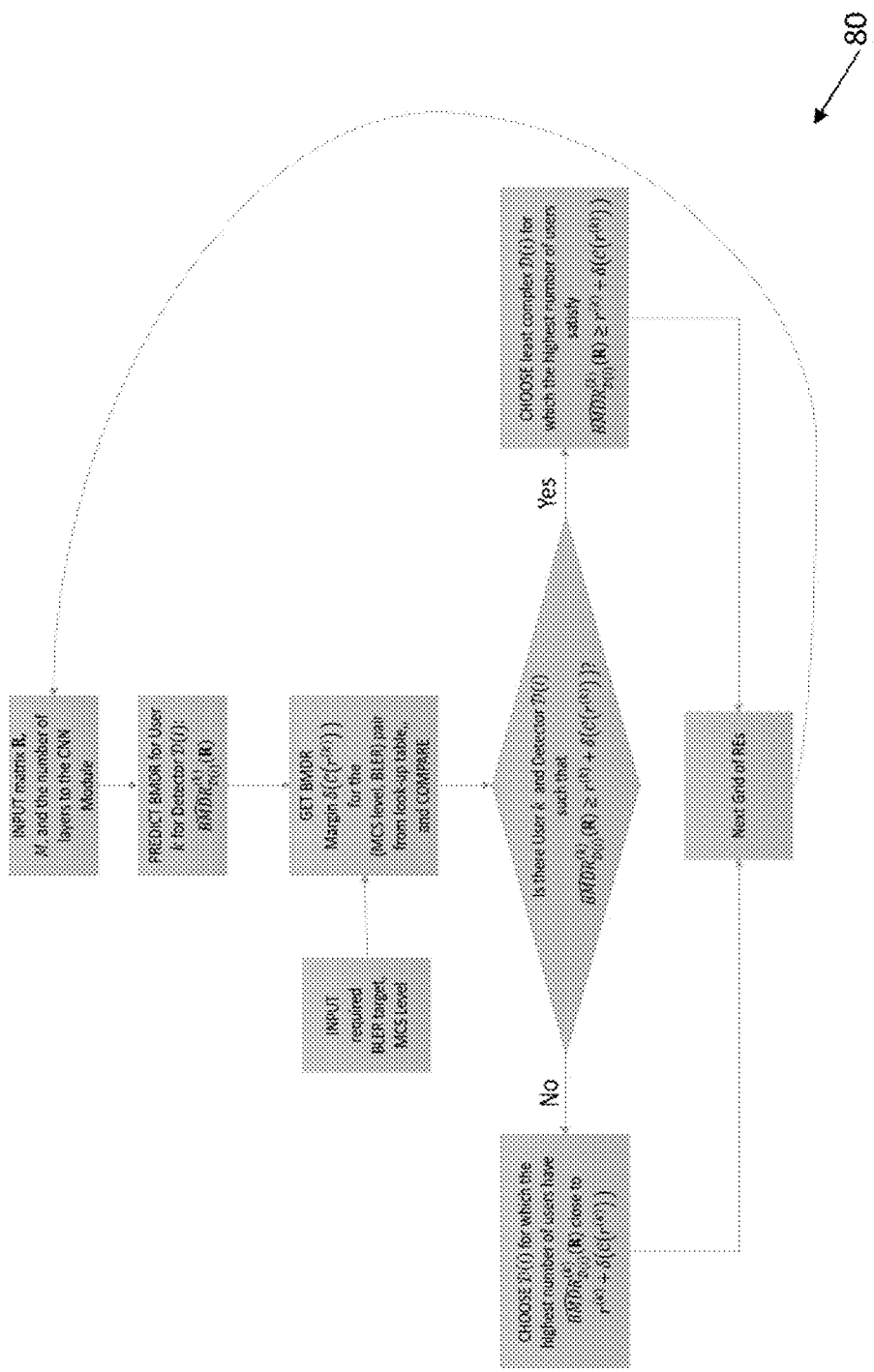

FIG. 8 is a flow chart showing an algorithm, indicated generally by the reference numeral 80, in accordance with an example embodiment. The algorithm 80 shows how the look-up table, for example generated using the algorithm 70, may be used for online detector selection.

A number of simulations have been used to investigate the principles described herein, as discussed further below.

For the purpose of simulations, we have considered a 4×16 single user MIMO system (4 Tx, 16 Rx). We considered a training dataset of 100000 channel realizations with conditions numbers uniformly ranging from 0-25 dB. An SNR range of −4 to 1 dB (at intervals of 0.1 dB) was considered for 4-QAM and MATLAB's Rate-2/3 dvbs2ldpc code of length 64800. The test dataset consists of 25000 channel realizations. In the CNN that we used for the simulation, we considered 4 convolutional layers followed by 4 dense layers, all with ReLU activation. Below is the summary of the model.

| Layer (type) | Output Shape | Param # |
|---|---|---|
| input_1 (InputLayer) | [(None, 8, 8, 1)] | 0 |
| Conv2D_1 (Conv2D) | (None, 8, 8, 128) | 640 |
| Conv2D_2 (Conv2D) | (None, 8, 8, 64) | 32832 |
| Conv2D_3 (Conv2D) | (None, 7, 7, 32) | 8224 |
| Conv2D_4 (Conv2D) | (None, 6, 6, 16) | 2064 |
| Flatten (Flatten) | (None, 576) | 0 |
| Dense_1 (Dense) | (None, 64) | 36928 |
| Dense_2 (Dense) | (None, 32) | 2080 |
| Dense_3 (Dense) | (None, 8) | 264 |
| Dense_4 (Dense) | (None, 2) | 18 |

Total params: 83,050
Trainable params: 83,050
Non-trainable params: 0

FIGS. 9A and 9B are plots showing normalised absolute error of example simulations for LMMSE and MLD detector algorithms respectively. In particular, FIGS. 9A and 9B show numerically calculated cumulative density function (CDF) of the normalized mean absolute deviation between the predicted BMDRs and the actual BMDRs (labels which were calculated by averaging over two thousand independent noise realizations and bit-streams). The dotted curve is for the case where the estimate is taken to be the mean BMDR of the training dataset for each SNR value in the dataset. It can be noted that more than 95% of the time, the predicted BMDRs are within 5% from the actual BMDRs.

Next, we simulate the real-time detection selection scenario. For our purpose, we use the following rule: if the target BLER is not met by either detector or if met by the LMMSE detector, the default choice is the LMMSE detector (because of less complexity in the former case). Otherwise, the MLD detector is the optimal choice.

FIGS. 10A and 10B are plots showing performance of example detection selection simulations.

We consider a particular channel with condition number 17.92 dB whose BER curves and BMDRs are shown in FIGS. 3 and 4 discussed above. For this channel, FIGS. 10A and 10B shows the fraction of the instances each detector was ideal for target BLERs of 0.01 and 0.001 respectively. The label marked 'None' is the case where neither detector meets the BLER target (but the LMMSE detector is the default choice because it is less complex).

Precision and recall metrics may be used for gauging the performance of a particular selection method. These metrics are well-known in the literature and are as given below.

$$\text{Precision} = \frac{\text{Number of True Positives}}{\text{Number of True Positives} + \text{Number of False Positives}}$$

$$\text{Recall} = \frac{\text{Number of True Positives}}{\text{Number of True Positives} + \text{Number of False Negatives}}$$

Figure 11A:
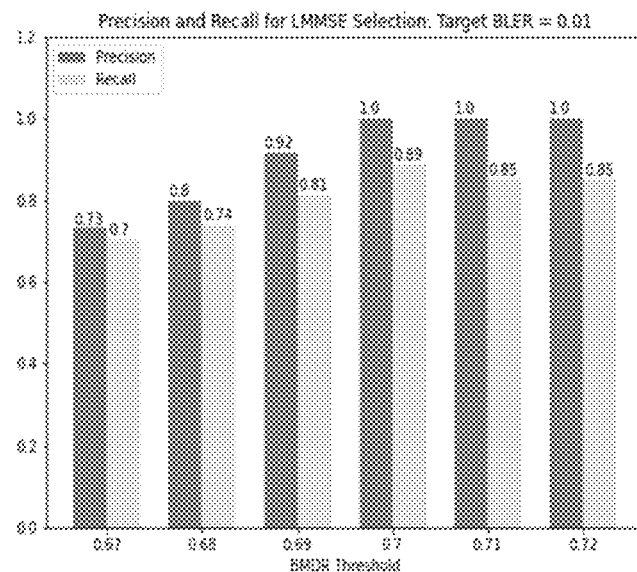
FIGS. 11A, 11B, 12A and 12B show precision and recall data for example simulations.
Figure 11B:
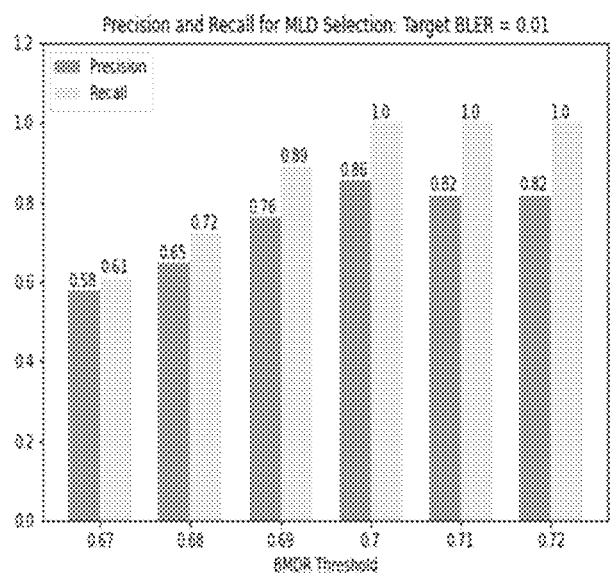
Figure 12A:
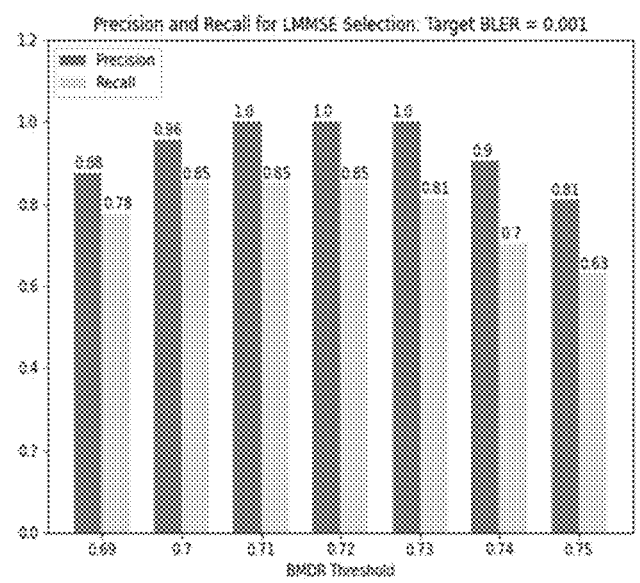
Figure 12B:
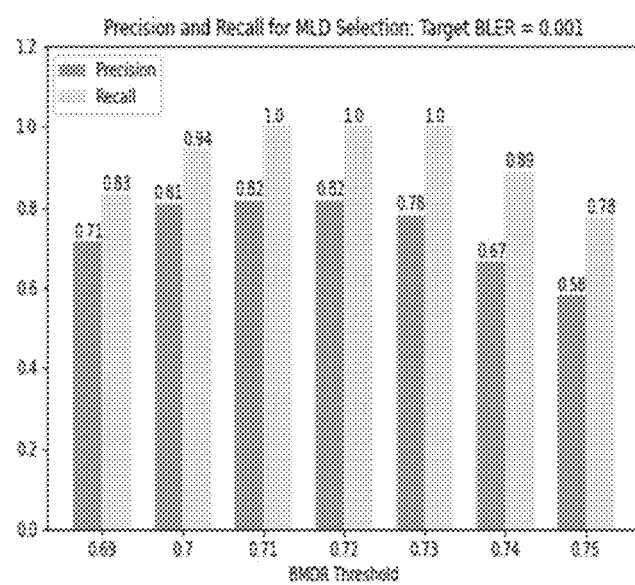

FIGS. 11A and 11B show precision and recall data for detectors at a target block error rate of 0.01. Similarly, FIGS. 12A and 12B show precision and recall data for detectors at a target block error rate of 0.001.

Figure 13A:
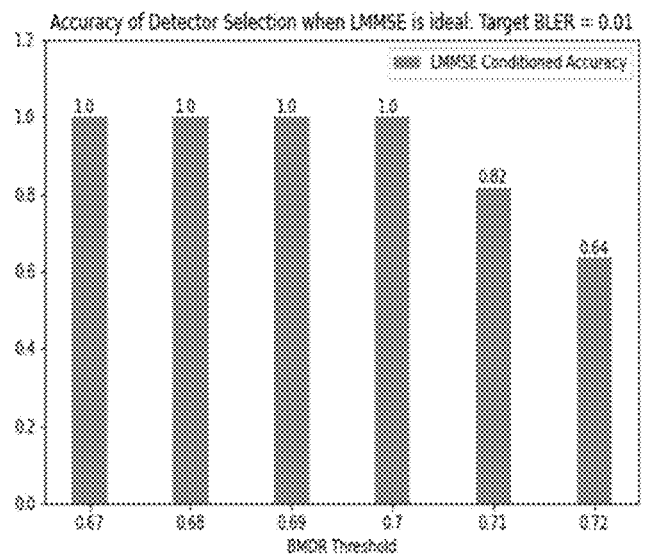
FIGS. 13A and 13B show detector selection accuracy for example simulations.
Figure 13B:
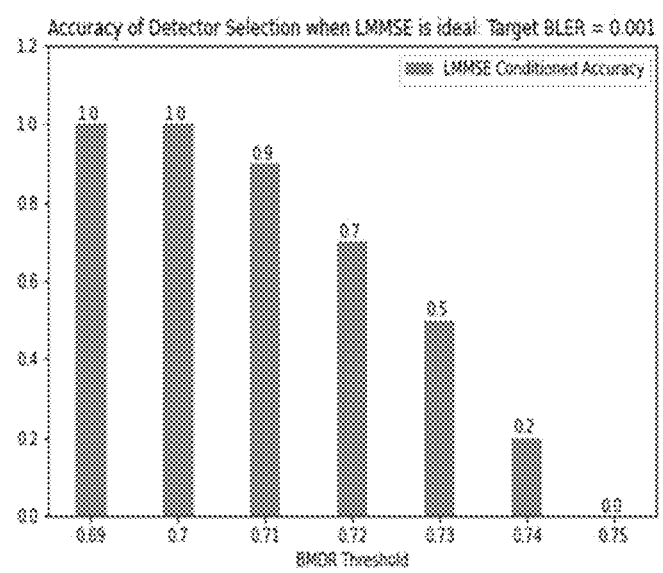

FIGS. 13A and 13B show detector selection accuracy for example simulations.

For the LMMSE detector, a precision of 1 is reached between 0.7 and 0.71 which means that the LMMSE was never chosen when the MLD was ideal. On the other hand, for the MLD, a recall of 1 is reached (equivalent to a precision of 1 for the LMMSE) but a precision of 0.82 means that there were instances when the MLD was chosen when the LMMSE should have been. The accuracy of choosing the LMMSE detector when it was indeed enough to meet the target BLER was found to be 1 at a BMR threshold between 0.70-0.71 for both target rates, as shown in FIGS. 13A and 13B. This means that the instances where the MLD was chosen when the LMMSE detector should have been were for the case of neither detector being enough to meet the BLER requirements.

Table 1 below provides a summary of observations based on simulated data.

TABLE 1

| | Target BLER = 0.01 | | Target BLER = 0.001 | |
| --- | --- | --- | --- | --- |
| | Ideal | Proposed Method (optimal BMDR Threshold = 0.7) | Ideal | Proposed Method (optimal BMDR Threshold = 0.705) |
| % of instances LMMSE detector was selected and BLER target met | 24.4 | 24.4 | 23.4 | 23.4 |
| % of instances MLD was selected and BLER target met | 40 | 40 | 38.3 | 38.3 |
| % of instances neither is good enough to meet BLER target and LMMSE detector is selected | 35.6 | 30 | 38.3 | 30 |
| % of instances neither is good enough to meet BLER target and MLD is selected | 0 | 5.6 | 0 | 8.3 |

Figure 14A:
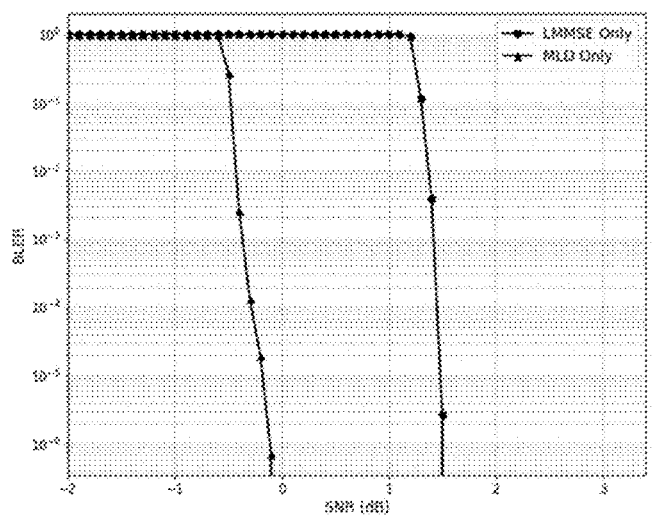
FIGS. 14A and 14B compare detector selection accuracy with baseline selection arrangements.
Figure 14B:
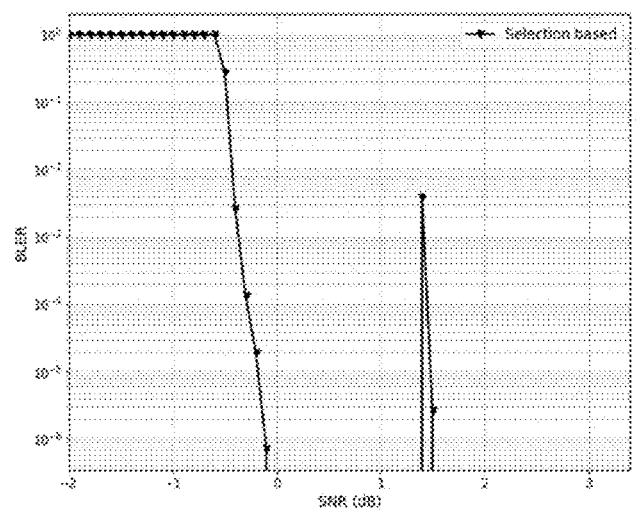

FIGS. 14A and 14B compare detector selection accuracy with baseline selection arrangements. Two baseline selection arrangements were considered: LMMSE only; and MLD only.

FIG. 14A shows BLER plots of these two baseline schemes. FIG. 14B On the right is the BLER plot obtained for the simulated scheme at a target BLER of 0.01 and a BMDR threshold of 0.7. For this MIMO configuration, the LMMSE detector requires approximately 20% of the computational needs of the MLD. From Table 1, it can be inferred that if only the LMMSE detector was used, it would meet the BLER requirements only 24.4% of the time in the range of SNR considered. If only the MLD was used, it would meet the BLER requirements 64.4% of the time but would incur 5 times the number of computations on average compared to the LMMSE. If the proposed scheme were to be employed, it would meet the BLER target 64.4% of the time but would only require 0.544+0.456*5=2.82 times the number of computations compared to the LMMSE-only scheme. This is summarized in Table 2.

TABLE 2

| Scheme | % of time target BLER = 0.01 met | Normalized number of computations (normalized by LMMSE computations) |
| --- | --- | --- |
| LMMSE only | 24.4 | 1 |
| MLD only | 64.4 | 5 |
| Proposed Scheme | 64.4 | 2.82 |

Figure 15:
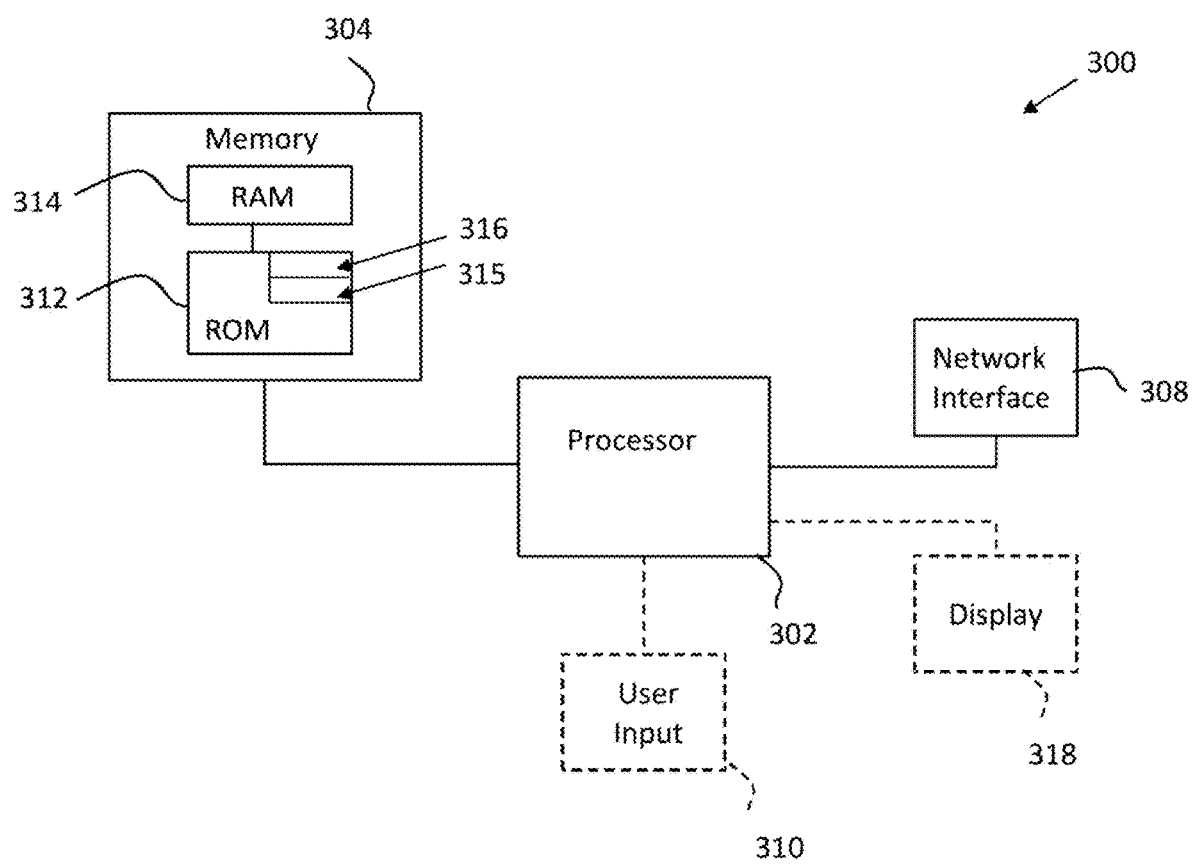
FIG. 15 is a block diagram of components of a system in accordance with an example embodiment.
Figure 16A:
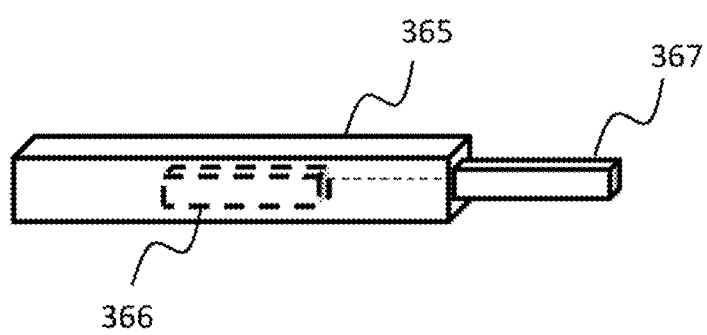
FIGS. 16A and 16B show tangible media, respectively a removable non-volatile memory unit and a compact disc (CD) storing computer-readable code which when run by a computer perform operations according to example embodiment.
Figure 16B:
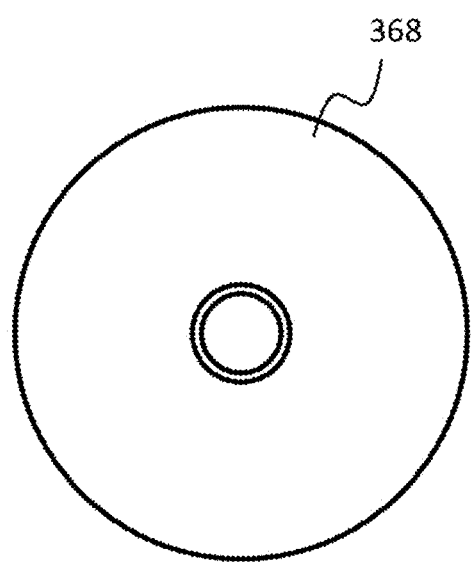

For completeness, FIG. 15 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 60, 70 and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 6, 7 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
at least one processor; and
at least one memory including computer program code, the at least one memory and computer program code being configured, with the at least one processor, to cause the apparatus to perform:
receiving transmissions over a channel at a receiver of a Multiple-Input Multiple-Output (MIMO) communication system, the transmissions being received from a plurality of transmitters in communication with the receiver, wherein each communication is a separate communication having a modulation and coding scheme;
converting an estimate of the channel into an estimate, for each of a plurality of transmitters, of a bit-metric decoding rate for each of a plurality of available MIMO detectors;
converting the estimated bit-metric decoding rate for each of the plurality of transmitters for each of the available MIMO detectors into an estimated bit error rate for each of the plurality of available MIMO detectors for each of the plurality of transmitters; and
selecting one of said available MIMO detectors for use in generating log-likelihood ratios for bits transmitted from said plurality of transmitters to said receiver, wherein said one of said available MIMO detectors is selected based on the estimated bit-error rates and a target block error rate.

2. The apparatus as claimed in claim 1, wherein the at least one memory and computer program code are further configured, with the at least one processor, to cause the apparatus to perform:
using a machine learning model to convert the estimate of the channel into said bit-metric decoding rate estimates.

3. The apparatus as claimed in claim 2, wherein the at least one memory and computer program code are further configured, with the at least one processor, to cause the apparatus to perform:
obtaining an upper triangular matrix based on a QR decomposition of a channel matrix, wherein the channel matrix is the estimate of the channel; and
using said machine learning model to convert the upper triangular matrix into said bit-metric decoding rate estimates.

4. The apparatus as claimed in claim 2, wherein the at least one memory and computer program code are further configured, with the at least one processor, to cause the apparatus to perform:
training the machine learning model based, at least in part, on estimated bit-metric decoding rate and corresponding bit error rate values computed during a plurality of system simulations.

5. The apparatus as claimed in claim 1, wherein the at least one memory and computer program code are further configured, with the at least one processor, to cause the apparatus to perform:
determining whether, for a particular one of the plurality of available MIMO detectors, the target block error rate is met for each transmission and, if so, determining that said MIMO detector meets said target block error rate.

6. The apparatus as claimed in claim 5, wherein the at least one memory and computer program code are further configured, with the at least one processor, to cause the apparatus to perform:
determining whether the particular one of the plurality of available MIMO detectors meets the target block error rate for a particular transmission based on whether an estimated bit-metric decoding rate is above a threshold.

7. The apparatus as claimed in claim 5, wherein the selecting one of said available MIMO detectors includes selecting one of said available MIMO detectors that meets said target block error rate for each of said transmissions.

8. The apparatus as claimed in claim 7, wherein selecting one of said available MIMO detectors includes selecting a simplest one of said available MIMO detectors that meets said target block error rate for each transmission.

9. The apparatus as claimed in claim 1, wherein the converting bit-metric decoding rate data into bit error rate data comprises using a lookup table.

10. The apparatus as claimed in claim 9, wherein the at least one memory and computer program code are further configured, with the at least one processor, to cause the apparatus to perform:
  determining a configuration of the MIMO system; and
  selecting said lookup table from a plurality of available lookup tables based on said determined configuration.

11. The apparatus as claimed in claim 3, wherein the at least one memory and computer program code are further configured, with the at least one processor, to cause the apparatus to perform receiving or generating said channel matrix.

12. The apparatus as claimed in claim 1, wherein the selecting said one of said available MIMO detectors includes updating said selection each time the channel estimate is updated.

13. A method, comprising:
  receiving transmissions over a channel at a receiver of a Multiple-Input Multiple-Output (MIMO) communication system, the transmissions being received from a plurality of transmitters in communication with the receiver, wherein each communication is a separate communication having a modulation and coding scheme;
  converting an estimate of the channel into an estimate, for each of a plurality of transmitters, of a bit-metric decoding rate for each of a plurality of available MIMO detectors;
  converting the estimated bit-metric decoding rate for each of the plurality of transmitters for each of the available MIMO detectors into an estimated bit error rate for each of the plurality of available MIMO detectors for each of the plurality of transmitters; and
  selecting one of said available MIMO detectors for use in generating log-likelihood ratios for bits transmitted from said plurality of transmitters to said receiver, wherein said one of said available MIMO detector is selected based on the estimated bit-error rates and a target block error rate.

14. A computer program embodied on a non-transitory computer-readable medium, said computer program comprising instructions for causing an apparatus to perform at least the following:
  receive transmissions over a channel at a receiver of a Multiple-Input Multiple-Output (MIMO) communication system, the transmissions being received from a plurality of transmitters in communication with the receiver, wherein each communication is a separate communication having a modulation and coding scheme;
  convert an estimate of the channel into an estimate, for each of a plurality of transmitters, of a bit-metric decoding rate for each of a plurality of available MIMO detectors;
  convert the estimated bit-metric decoding rate for each of the plurality of transmitters for each of the available MIMO detectors into an estimated bit error rate for each of the plurality of available MIMO detectors for each of the plurality of transmitters; and
  select one of said available MIMO detectors for use in generating log-likelihood ratios for bits transmitted from said plurality of transmitters to said receiver, wherein said one of said available MIMO detector is selected based on the estimated bit-error rates and a target block error rate.

* * * * *